United States Patent [19]

Rasmussen et al.

[11] Patent Number: 5,085,843
[45] Date of Patent: Feb. 4, 1992

[54] METHOD OF DESULPHURIZING HOT WASTE GAS

[75] Inventors: Stig Rasmussen, Gadstrup; Bjarne Rasmussen, Copenhagen; Karsten S. Felsvang, Allerød, all of Denmark

[73] Assignee: A/S Niro Atomizer, Soborg, Denmark

[21] Appl. No.: 552,645

[22] Filed: Jul. 16, 1990

[30] Foreign Application Priority Data

Jul. 17, 1989 [DK] Denmark .............................. 3519/89

[51] Int. Cl.$^5$ .............................................. C01B 17/05
[52] U.S. Cl. ...................................... 423/242; 423/244
[58] Field of Search .......... 423/242 A, 242 R, 244 A, 423/244 R, 240 S

[56] References Cited

U.S. PATENT DOCUMENTS

| | | |
|---|---|---|
| 3,969,482 | 7/1976 | Teller ................... 423/242 |
| 4,208,383 | 6/1980 | Kisters et al. ........... 423/240 |
| 4,279,873 | 7/1981 | Felsvang et al. .......... 423/242 |
| 4,600,428 | 7/1986 | Yoon . |
| 4,604,269 | 8/1986 | Yoon . |

FOREIGN PATENT DOCUMENTS

0286232A1 12/1988 European Pat. Off. .
3742051C1 6/1989 Fed. Rep. of Germany .

OTHER PUBLICATIONS

Perry's Chemical Engineering Handbook, 1984, 22-50, 22-51.

Primary Examiner—Gary P. Straub
Assistant Examiner—Timothy C. Vanoy
Attorney, Agent, or Firm—Armstrong, Nikaido, Marmelstein, Kubovcik & Murray

[57] ABSTRACT

A desulphurization process, in which acid components of waste gas are removed by spray drying absorption, using an aqueous suspension of slaked lime or limestone as absorbent with recycling of part of the reaction product to the absorbent, is controlled on the basis of determination of the chloride content of the aqueous suspension including recycled reaction product. The chloride content of the absorbent is used as the basis for (a) controlling the amount of chloride in the aqueous suspension to such a value that a specific chloride content of the spray dried product is between 1 and 7% by weight, and, within this range is related to the difference between the temperature of the desulphurized waste gas and the adiabatic saturation temperature thereof, and/or (b) for controlling the quantity of water evaporated by the spray drying, which is also related to the set forth chloride content, to change the difference between the temperature of the desulphurized waste gas and the adiabatic saturation temperature thereof, to provide a minimum temperature difference so as to maximize the acid base reaction yet maintain an actual temperature difference high enough to avoid sticky products.

8 Claims, 1 Drawing Sheet

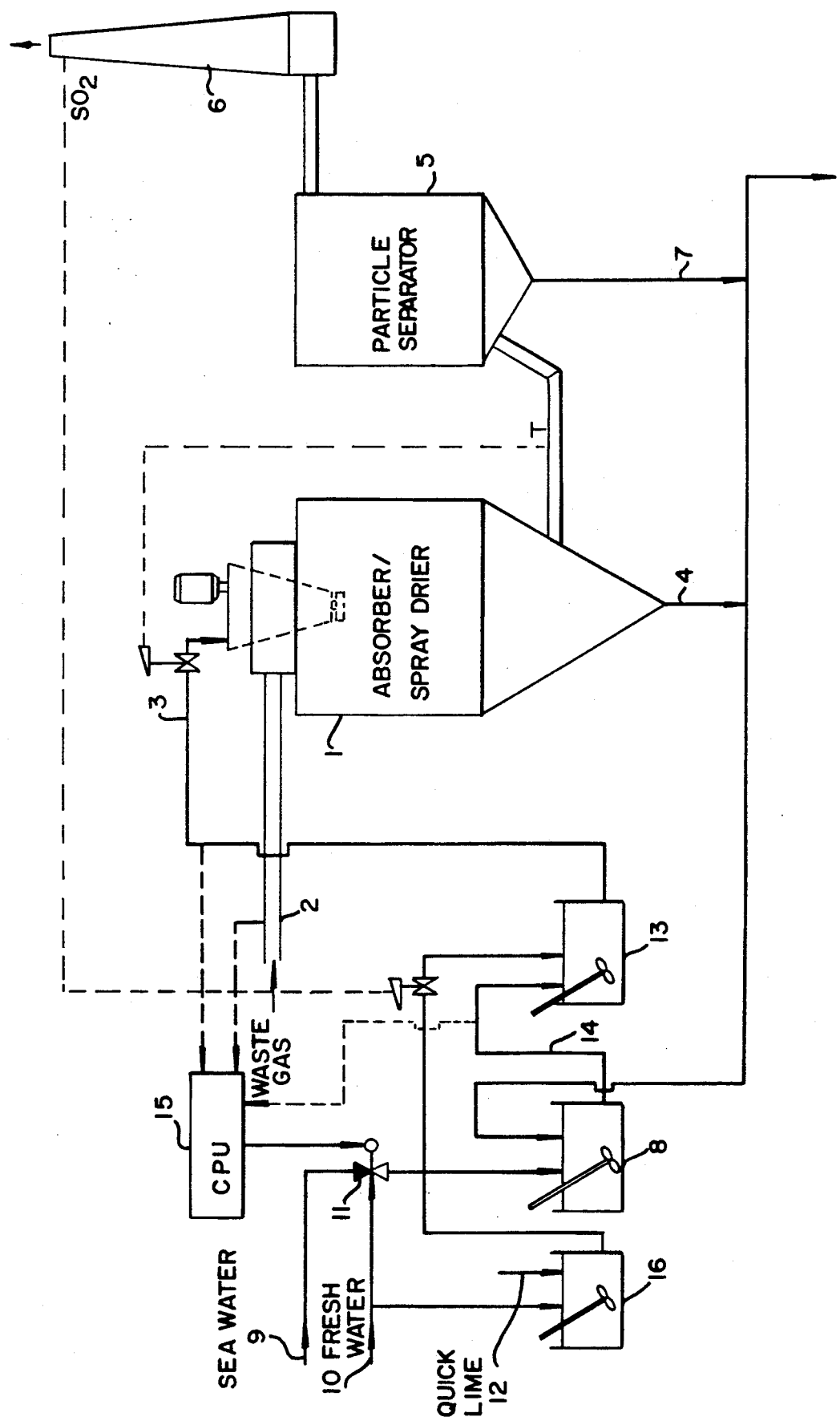

METHOD OF DESULPHURIZING HOT WASTE GAS

The invention relates to the desulphurization of waste gas by spray drying absorption, using slaked lime or limestone as absorbent.

The method according to the invention is of the type described for instance in GB patent No. 2021086 (which corresponds to U.S. Pat. No. 4,279,873) incorporated herein by reference.

By said type of methods, an aqueous absorbent suspension is atomized in a hot flue gas stream whereby the droplets of suspension produced are dried to form a powder while a portion of the sulphur dioxide and other acidic gases, if any, such as hydrogen chloride are absorbed. The powder thus produced is partly recycled for preparing the aqueous absorbent suspension.

Accordingly a process is described in which the fly ash present in the flue gas is only separated from the latter after the absorption and spray drying process, and is partly recycled together with a part of the powder resulting from the drying process to the step in which the calcium hydroxide-containing suspension is manufactured, and the ratio between on one side the amount of the calcium hydroxide-containing suspension and the content of dry matter thereof and, on the other side the temperature and moisture content of the flue gas, is adjusted to obtain a temperature of the flue gas after the treatment which is 8°–40° C. above the adiabatic saturation temperature (as to water) of said gas. A determining feature for obtaining a sufficient absorption using a relatively small amount of calcium hydroxide is, moreover, that the drying process is operated using such conditions that the flue gas after the treatment has a temperature which is 8°–40° C. above the saturation temperature of the treated gas. It has been found that when the latter conditions are fulfilled a substantially better absorption is achieved than when the temperature is outside this range. If the conditions are so that the gas after the treatment has a temperature which is more than 40° C. above its saturation temperature, the resulting powder will have a relatively high content of non-reacted calcium hydroxide, probably because the drying under these conditions is performed so fast that the period is too short in which the particles have a sufficient moisture content to enable a substantial reaction with the sulfur dioxide. Also by using temperatures lower than said range unsatisfactorily results are, however, obtained. This is due mainly to the fact that in these cases a relatively large amount of calcium carbonate is formed, which has a somewhat lower reactivity to sulfur dioxide than calcium hydroxide. This production of carbonate will of course be especially adverse in a process using partial recycling as the present one.

It is known, e.g. from said GB patent and from EP 0 286 232 A1, that the presence of chloride ions has a promoting effect on the reaction between sulphur dioxide and calcium hydroxide or calcium carbonate in spray drying absorption. Such a presence of chloride ions frequently occurs either because the waste gas to be purified contains, beyond sulphur dioxide, hydrogen chloride originating from chlorides in the fuel, or because chloride containing water, such as sea water or waste water polluted with salt, is used in the preparation of the absorbent suspension to be used in the spray drying absorption.

Due to the fact that calcium chloride is particularly hygroscopic, a relatively large chloride content, however, puts an increased demand on the efficiency of the drying process in spray drying absorption, with the result that the waste gas leaving the spray drying absorption step must necessarily have a temperature substantially above its adiabatic saturation temperature, thereby ensuring that the reaction product is dried sufficiently to be non-adhesive.

However, an improved drying efficiency of the absorption process, as expressed in a greater difference between the temperature of the discharging treated waste gas and its adiabatic saturation temperature is undesired per se, since an increased difference between said two temperatures per se entails a substantially reduced $SO_2$-absorption.

In view of the fact that the presence of chloride, on one hand, thus entails a desired promotion of the $SO_2$-absorption (under otherwise unchanged conditions) and, on the other hand, impedes the drying, there is an optimum value which, expressed as chloride content of the reaction product obtained by the spray drying absorption, is between 1 and 7% by weight, dependent on the operational conditions and the construction of the utilized apparatus.

However, the chloride concentration in the feed suspension produced using partial recycling of the powdery product resulting from the spray drying absorption may vary considerably and is influenced by several process parameters and conditions: such as amount and temperature of the flue gas to be desulphurized and the concentration of $SO_x$ therein, since these features determine the degree of dilution and, obviously, variations in chloride contents of flue gas and in the sea or waste water used for preparing the suspension are reflected in the chloride concentration in said suspension.

To avoid the risk of operational problems it has hitherto been conventional to perform the spray absorption by using such efficient drying conditions that substantial variations in the chloride content of the reaction products could be tolerated. However, said efficient drying conditions involves that the purified gas leaves the spray drying absorption zone at $\Delta T$, i.e. the difference between actual temperature and adiabatic saturation temperature, higher than necessary when the chloride content is lower than the expected maximum value.

To obtain a maximum exploitation of the absorbent based on slaked lime or limestone in the spray drying absorption process, it is, however, important that the purified waste gas leaves the spray drying absorption zone at a $\Delta T$ that is not substantially higher than necessary in order to carry out the drying.

The present invention is based on the recognition that savings of absorbent may be obtained if a further control is used, besides those usually employed in spray absorption processes.

Said further control is based on a frequent or preferably continuous determination of the chloride content of the absorbent suspension and utilization of said determinations for ensuring that even with varying process parameters and conditions as explained above, an optimum or almost optimum chloride content will be present during the absorption reaction and that also an optimum relation between said chloride content and the $\Delta T$ is maintained.

Accordingly, the invention relates to a method of desulphurizing hot waste gas by spray drying absorption, according to which (i) an aqueous chloride containing absorbent suspension of slaked lime and/or limestone is prepared, (ii) the obtained suspension is spray-dried in the hot waste gas, (iii) the powdered product thus formed including reaction products between lime and/or limestone and the sulphur oxides and hydrogen chloride of the waste gas and non-reacted lime and/or limestone is/are separated, and (iv) part of the product separated is step (iii) is recycled for use in the preparation of the suspension in step (i).

Said method comprises according to the invention determining the chloride content of the absorbent suspension prepared in step (i) and in using this determination for:

a) controlling the amount of chloride in the suspension to such a value that a specific chloride content selected between 1 and 7% by weight, dependent on the difference between the temperature of the desulphurized waste gas and the adiabatic saturation temperature thereof is obtained in the powdered product which is separated in (iii), and/or b) controlling the quantity of water evaporated by the spray drying, thereby changing the difference between the temperature of the desulphurized waste gas and the adiabatic saturation temperature thereof as an increasing function of said chloride content.

The method according to the invention is illustrated in detail with reference to the drawing showing very schematically some of its embodiments.

In the drawing 1 is a spray drying absorption apparatus to which the waste gas to be desulphurized is passed through a duct 2.

An aqueous absorbent suspension based on slaked lime or limestone is supplied through a conduit 3.

The sulphur oxides and hydrogen chloride of the waste gas is reacted with the absorbent in 1. The reaction of the hydrogen chloride may be considered as amounting to almost 100%.

Part of the powdered reaction product obtained by the spray drying absorption may be withdrawn through a conduit 4, while the main portion is generally entrained with the waste gas to a particle separating apparatus 5 that is preferably a bag filter but which may as well be an electrostatic precipitator, possibly combined with a cyclone.

The purified gas may be passed from here to a stack 6.

The reaction product separated in the particle separating apparatus 5 is withdrawn through a conduit 7.

Part of the reaction product withdrawn through 4 and 7 is removed from the system, while the remainder is fed back, i.e. it is passed to a container 8 in which it is suspended in water that may be fresh water or sea water or mixtures thereof as explained in the following.

Thus, reference numeral 9 designates a conduit for the supply of sea water or other salt water, while reference numeral 10 designates a conduit for fresh water. A valve 11 allows to control the ratio between and the absolute amount of sea water and fresh water flown to container 8.

The illustrated embodiment makes use of a slaking container 16 to which quick-lime is supplied through 12 and fresh water is supplied from conduit 10.

A mixing container 13 is through a conduit 14 supplied with a suspension of the recycled reaction product from container 8 and an aqueous suspension of slaked lime is supplied from slaking container 16.

The absorbent suspension obtained by the mixing in 13 is passed through conduit 3 to the spray drying absorption apparatus.

In conduit 3, or alternatively, as shown in dotted lines, in conduit 14 a metering device is inserted, preferably a conductivity meter, for recording the chloride content of the passing suspension. The signals from said metering device are transmitted to a control unit 15 which on the basis of the received signals controls valve 11 for the adjustment of the amounts of fresh water and sea water supplied to container 8.

A variation of the hydrogen chloride content in the waste gas passed to duct 2, e.g. an increase caused by the change-over to more chloride containing fuel, or a variation of one or more other process conditions, may entail that the powdered product recycled to container 8 will have a larger chloride content and this will be monitored by the continuous recordings in conduits 3 or 14. On the basis of the signals transmitted from said recordings to unit 15 this unit emits a control signal to valve 11, said signal effecting, in the embodiment illustrated in the drawing according to which sea water is used, a reduction of the ratio between the amount of sea water and fresh water passed to container 8. Alternatively or simultaneously, the signal emitted from 15 may entail an adaptation of the amount of the flow in conduit 3 to the spray drying absorption apparatus, thereby causing the amount of water evaporated therein to be adjusted so that $\Delta T$ of the discharging gas increases and the problems otherwise involved by the increased chloride content to be eliminated.

If very frequent and sudden variations of the hydrogen chloride content occur in the gas to be desulphurized, or if the product from the spray drying absorption apparatus 1 or the particles separating device 5 is only recycled to 8 at a considerable delay, e.g. after storing in silo or the like, it is appropriate to supplement the above specified control system with a recording of the hydrogen chloride content of the supplied gas in 2, as illustrated in the drawing. The result thus obtained is then used for supplementing the results obtained by the measuring in either 3 or 14 in order to compensate for changes in the hydrogen content of the gas which have still not been fully reflected in changes of the chloride content of the suspensions in conduits 3 or 14.

It will be understood that the control system practised by the method according to the invention is a supplement to conventional control systems practised with the view of obtaining appropriate stoechiometric ratios between the sulphur oxide content of the waste gas and absorbent and with the view of fulfilling other conditions necessary or advantageous with respect to carrying out the desulphurization process, but by making it possible to optimize the reaction conditions also at varying process conditions influencing the chloride concentration during the absorption, it substantially contributes to improving the efficiency and economy of the absorption process.

We claim:

1. In the method of desulfurizing hot waste gas, containing acid components comprising at least sulfur oxides, by a spray drying, absorption process comprising:

contacting an absorbent suspension of more than the stoichiometric required proportion of slaked lime and/or limestone absorbent in water, containing an effective amount of chloride, to promote the reaction between said slaked lime and/or limestone and sulfur oxides in said waste gas in a given amount of time at a prescribed temperature;

reacting said slaked lime and/or limestone in said suspension with said sulfur oxides in said waste gas, while substantially simultaneously spray drying said suspension by said hot waste gas to evaporate water from said absorbent suspension and to form a powdery product comprising a reaction product of said slaked lime and/or limestone and said sulfur oxides, which powdery product also contains chloride;

causing the temperature of gas, containing said powdery product, leaving said spray drying to be at a temperature of about 8° to 40° C. above its adiabatic saturation temperature, the differences in these temperatures being defined as $\Delta T$;

separating at least a portion of said powdery product from said gas; and recycling a portion of said powdery product to the formation of said absorbent suspension;

the improvement, whereby substantially minimizing said $\Delta T$, while also minimizing the excess of said absorbent exceeding stoichiometry with respect to the sulfur content of said waste gas which is required to remove substantially all of said sulfur content from said waste gas, which comprises, during said spray drying and reaction, at least intermittently:

A) determining the chloride content (I) of said absorbent suspension;

B) determining said $\Delta T$ (II);

C) maintaining the chloride content of said suspension between greater than 0% and below about 7%;

D) adjusting at least one of (I) or (II), such that any changes in said chloride content and in said $\Delta T$ are in the same direction and are cummulatively sufficient to maximize the reaction of said acid components and said slaked lime and/or limestone, and to substantially avoid the formation of sticky, adhesive products.

2. The improved method as claimed in claim 1 including substantially continuously carrying out steps a) to d).

3. A method as claimed in claim 1 wherein said aqueous suspension comprises sea water.

4. A method as claimed in claim 1 including slaking lime in fresh water; suspending the recycled portion of the reaction product in fresh or sea water; and subsequently mixing the obtained suspension with said slaked lime.

5. A method as claimed in any of claim 1, comprising determining the chloride content of the absorbent suspension by continuously metering the electric conductivity of the completed absorbent suspension or of the suspension of the recycled product used in the preparation thereof.

6. A method as claimed in claim 1 wherein the chloride content of said hot waste gas varies which method further comprises measuring the hydrogen chloride content of said waste gas.

7. A method as claimed in claim 1 wherein the powdery product is not immediately recycled to produce said absorbent suspension, but is recycled to such use only after a time delay; which method further comprises measuring the hydrogen chlorides content of said waste gas.

8. A method as claimed in claim 6, including continuously metering the electric conductivity of the completed absorbent suspension or of the suspension of the recycled product used in the preparation thereof in order to determine the chloride content of the absorbent suspension.

* * * * *

UNITED STATES PATENT AND TRADEMARK OFFICE
CERTIFICATE OF CORRECTION

PATENT NO. : 5,085,843

DATED : February 4, 1992

INVENTOR(S) : Rasmussen et al

It is certified that error appears in the above-identified patent and that said Letters Patent is hereby corrected as shown below:

On the cover page, Item [73], "A/S Niro Atomizer, Soborg, Denmark" should read --Niro A/S, Soborg, Denmark--.

Signed and Sealed this

Twenty-eighth Day of September, 1993

Attest:

BRUCE LEHMAN

*Attesting Officer*     *Commissioner of Patents and Trademarks*